Patented Feb. 16, 1954

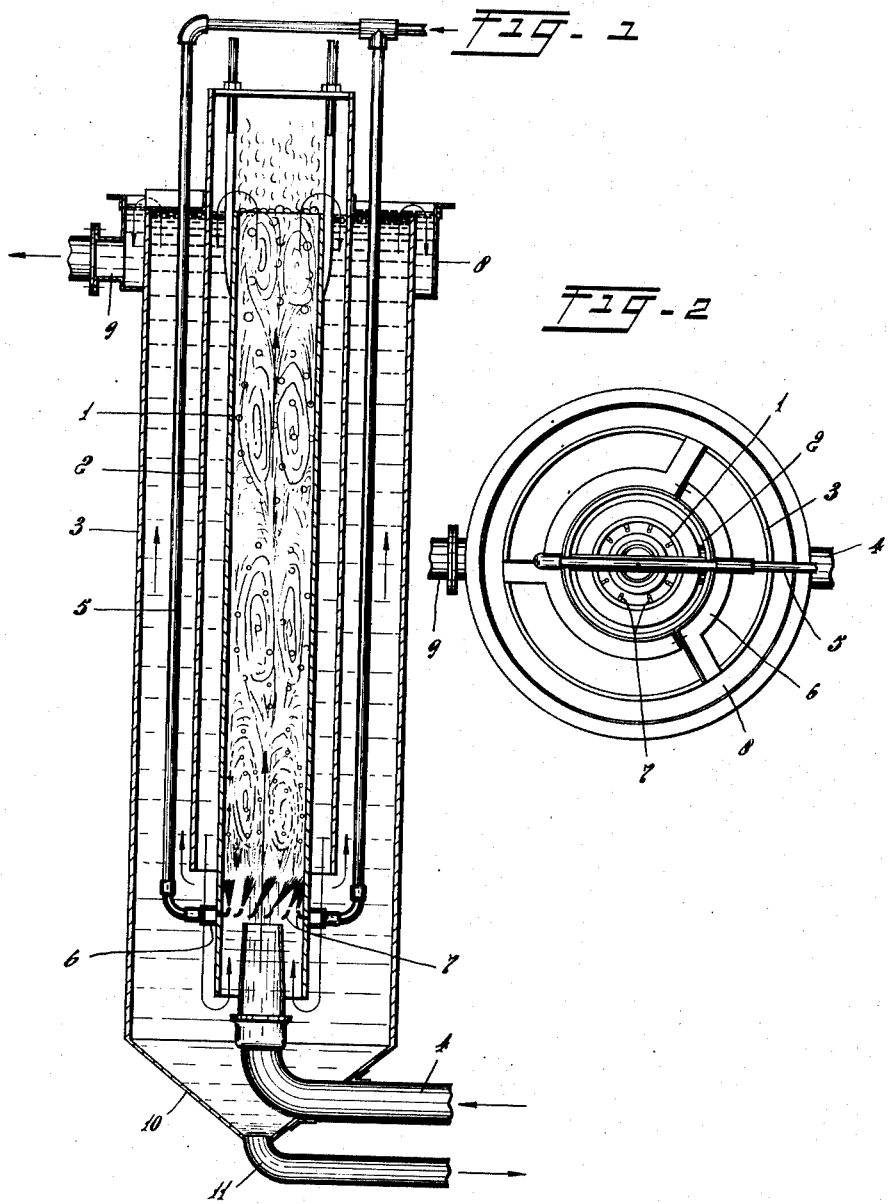

2,669,440

UNITED STATES PATENT OFFICE 2,669,440

APPARATUS FOR THE AERATION OF WATER FOR PURIFICATION PURPOSES

Pieter Cornelis Lindenbergh, Katwijk, a/d Rijn, Netherlands, assignor to N. V. Leidsche Duinwater Maatschappij, Leiden, Netherlands, a corporation of the Netherlands Application September 10, 1951, Serial No. 245,815

Claims priority, application Netherlands September 12, 1950

2 Claims. (Cl. 261—124)

One of the systems for the purification of manganesian and ferriferous water to produce drinking water consists in the subsequent aeration, inter alia to oxidize iron, manganese and organic matter (e. g. liquid ammonia), thus making these substances defilterable, pre-filtration, through fairly coarse filter beds, that may be simply cleaned by washing, after-filtration, through slow-acting sand filters, primarily for bacteriological purification.

The aeration of the water to be purified has hitherto been mostly done by means of sprinkling into the air. For this purpose various kinds of sprinklers are in use. The process is a fairly rapid one. The time between the moment in which a drop is whirled into the air and that in which it drops into the water over the pre-filters, is only a fraction of a second. In some cases, indeed, it occurs that the time necessary for the chemical reaction to pass quite satisfactorily with this oxidation, is too short. This reaction is then not yet quite completed after the water has passed the pre-filters. As a matter of fact, the latter work comparatively rapidly. The after-filters must then take over part of the task of the pre-filters, thus impeding the bacteriological action of these after-filters. The result is additional cleaning of the after-filters, which entails serious difficulties for the filtering activities. The filtering speed in the pre-filters is thereby limited, necessitating a larger pre-filter surface. This requires substantial capital expenditure.

The object of the invention is to avoid the disadvantages encountered with the conventional apparatuses by making available an improved apparatus for the aeration of water.

For this purpose the apparatus according to the invention consists of at least three concentric tubes formed into one column, the outer one of which tubes at the one end being provided with a water outlet-pipe and at the other end shut off by a bottom, the inner tube at the one end ending at some distance from the bottom, there amply enclosing the end of a water supply-line and at the height of the outlet of this line at the inner side being provided with a crown connected to one or more air supply lines and mouthpieces arranged in different directions, and ending at the other end within the intermediate tube, this latter tube ending at a greater distance from the bottom than the inner one. According to the invention the inner tube may, in addition, be axially adjustable. To illustrate the invention an embodiment of the aerating apparatus will be described with reference to the drawing.

Fig. 1 is a vertical longitudinal section of the apparatus.

Fig. 2 is a top view.

According to the drawing the apparatus consists substantially of three concentric tubes 1, 2 and 3 formed into one vertical column. The crude water (quantity Q) is supplied from below via a supply line 4 into the inner tube 1. Air supplied through the lines 5 is blown in at about equal height, some 40 cm. above the lower side of tube 1 and that via a chamber 6 encircling this tube 1. In that chamber mouth-pieces 7 with small outflow apertures are arranged in tube 1, all of which point obliquely upwards in the same spatial quadrant, but in different directions and to unequal heights. Through these mouthpieces 7 the air is blown in finely divided proportion into the water supplied by line 4, the special arrangement of the mouthpieces allowing the air-bells to reach the entire section of tube 1. In addition to an upward movement of the water in the inner tube 1 a highly turbulent movement is created by this arrangement.

The water mixed with the blown-in air and thus obtaining a lighter specific gravity, is driven up in tube 1, being very intensively mixed with the air as a result of the severe turbulence. At the upper end of tube 1 the superfluous air escapes from the water that by its own gravity after passing the upper edge of tube 1 moves downwards in the spaces between the tubes 1 and 2. Arrived at the bottom of tube 2, as much water (Q) separates as is supplied via line 4, and the remainder $(n-1)Q$ again passes upwards through the inner tube 1 as a result of the sucking action, some 40 cm. higher a quantity of water (Q) from line 4 being added.

The separated water passes upwards between the tubes 2 and 3 and is carried off as aerated water via an overflow 8 and an outlet-pipe.

The effect of the circulation of the water is a prolonged intensive mixing with air. Three to four times over the water comes into contact with the blown-in air flows supplied by the lines 5 and the mouth-pieces 7, constantly forming a very large number of fresh contact surfaces of air and water.

The duration of the mixing of air and water as compared with sprinkling into the air is considerably extended, namely to a few minutes, resulting in the chemical process having sufficient time to effect the required conversions.

As a result the pre-filter speed can be considerably increased without a detrimental effect to the after-filters. This means a considerable saving in capital expenditure on the extension of pre-filter plants.

The inner tube 1 has been made vertically adjustable, so that by adjustment at a given height the correct spot for blowing the air into the crude water may be very accurately defined to obtain the most favourable effect. As incidental advantages of the apparatus according to the invention may be mentioned: by reversing the direction of flow of the water at the foot of tube 2 a quantity of mud (formed, if necessary, by oxidation) is separated which may be periodically removed via the cone-shaped bottom 10 and the outlet-pipe connected thereto. So this quantity of mud, which would give rise to trouble on the filters, no longer burdens the pre-filters. The pre-pressure of the water with a sprinkler installation of known structure amounts to at least 1 to 1½ meters water-pressure. The pre-pressure of the water to be supplied for the apparatus according to the invention is at most 0.30 meter water-pressure. As a result an existing pumping plant acquires a greater capacity or may do with less power.

To install the apparatus according to the invention requires comparatively little room, whereas the mounting of conventional sprinkler installations demands large and well-ventilated rooms, which on account of the presence of gases and vapor require much maintenance and upkeep.

The apparatus according to the invention is also adapted for the aeration of sewage-water to oxidize the assimilable organic matter present therein, and is extremely fit to mix intensively through the water chemical substances to be added to the crude water.

I claim:

1. An apparatus for aerating water comprising a substantially vertical outer tube having a water outlet at the top and being closed at the bottom, a substantially vertical inner tube, substantially coaxially disposed within said first named outer tube and terminating at some distance above the bottom of said outer tube, a substantially vertical intermediate tube, substantially coaxially disposed within the space between said first named outer tube and said second named inner tube and terminating at a greater distance above the bottom than said second named inner tube, the space confined between said intermediate tube and said inner tube being connected at the top of said inner tube, a water inlet nozzle projecting into the bottom extremity of said second named inner tube and being substantially coaxially arranged with said inner tube, said water inlet nozzle and said inner tube together confining an annular passage having an appreciable cross-sectional area, and a plurality of air-inlets in the wall of said second named inner tube circumferentially spaced apart and located at substantially the same level as the top of said water inlet nozzle, said air-inlets being connected to at least one air-supply conduit, and terminating in nozzles projecting upwardly in various directions.

2. An apparatus as claimed in claim 1, further comprising means for adjusting the position of said second inner tube axially thereof.

PIETER CORNELIS LINDENBERGH.

References Cited in the file of this patent

UNITED STATES PATENTS

| Number | Name | Date |
|---|---|---|
| 830,552 | Zeigler | Sept. 11, 1906 |
| 943,422 | Knoepfel | Dec. 14, 1909 |
| 953,960 | Koppers | Apr. 5, 1910 |
| 1,123,011 | Ripley | Dec. 29, 1914 |
| 1,139,024 | Frank | May 11, 1915 |